(12) United States Patent
Bertolotti

(10) Patent No.: US 8,562,300 B2
(45) Date of Patent: Oct. 22, 2013

(54) WIND TURBINE WITH HIGH SOLIDITY ROTOR

(75) Inventor: Fabio P. Bertolotti, South Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 581 days.

(21) Appl. No.: 12/558,861

(22) Filed: Sep. 14, 2009

(65) Prior Publication Data

US 2011/0064578 A1    Mar. 17, 2011

(51) Int. Cl.
*F01D 5/00* (2006.01)

(52) U.S. Cl.
USPC ............. 416/204 A; 416/244 R; 290/44

(58) Field of Classification Search
USPC ........... 416/140, 9, 204 A, 204 R, 131, 244 R
See application file for complete search history.

(56) References Cited

U.S. PATENT DOCUMENTS

| | | |
|---|---|---|
| 4,083,651 A | 4/1978 | Cheney, Jr. et al. |
| 4,160,170 A | 7/1979 | Harner et al. |
| 4,161,658 A | 7/1979 | Patrick |
| 4,189,648 A | 2/1980 | Harner |
| 4,201,514 A | 5/1980 | Huetter |
| 4,219,308 A | 8/1980 | Bottrell |
| 4,269,563 A | 5/1981 | Sharak et al. |
| 4,339,666 A | 7/1982 | Patrick et al. |
| 4,342,539 A | 8/1982 | Potter |
| 4,352,629 A | 10/1982 | Cheney, Jr. |
| 4,352,634 A | 10/1982 | Andrews |
| 4,353,681 A | 10/1982 | Doman |
| 4,366,386 A | 12/1982 | Hanson |
| 4,545,728 A * | 10/1985 | Cheney, Jr. ............... 416/11 |
| 4,632,637 A | 12/1986 | Traudt |
| 4,703,189 A | 10/1987 | DiValentin et al. |
| 4,792,700 A | 12/1988 | Ammons |
| 5,213,470 A | 5/1993 | Lundquist |
| 5,295,793 A | 3/1994 | Belden |
| 6,327,957 B1 | 12/2001 | Carter, Sr. |
| 6,441,507 B1 | 8/2002 | Deering et al. |
| 6,465,902 B1 | 10/2002 | Beauchamp et al. |
| 6,523,781 B2 | 2/2003 | Ragner |
| 6,609,889 B1 | 8/2003 | Vilsboll |
| 6,769,873 B2 | 8/2004 | Beauchamp et al. |
| 6,782,667 B2 | 8/2004 | Henderson |
| 6,974,307 B2 | 12/2005 | Antoune et al. |
| 7,004,724 B2 | 2/2006 | Pierce et al. |
| 7,071,578 B1 | 7/2006 | Shibata et al. |
| 7,160,083 B2 | 1/2007 | Pierce et al. |

(Continued)

OTHER PUBLICATIONS

Wind Turbine Tip Speed Ratio, Mar. 9, 2007, http://www.reuk.co.uk/wind-turbine-tip-speed-ratio.htm.*

*Primary Examiner* — Edward Look
*Assistant Examiner* — William Grigos
(74) *Attorney, Agent, or Firm* — Carlson, Gaskey & Olds, PC

(57) ABSTRACT

A wind turbine includes a nacelle support structure rotationally mounted to a tower through a yaw bearing for rotation about a yaw axis. A hollow shaft is rotationally mounted to the nacelle support structure through a rotor bearing for rotation about a rotor axis of rotation and a blade support body is mounted to the hollow shaft, the blade support body supports either of a two-bladed rotor system and a three-bladed rotor system, the two-bladed rotor system and the three-bladed rotor system have essentially equal solidity.

15 Claims, 4 Drawing Sheets

(56) References Cited

U.S. PATENT DOCUMENTS

| | | |
|---|---|---|
| 7,311,000 B2 | 12/2007 | Smith et al. |
| 7,317,260 B2 | 1/2008 | Wilson |
| 7,344,360 B2 | 3/2008 | Wetzel |
| 7,425,774 B2 | 9/2008 | Shibata et al. |
| 7,425,775 B2 | 9/2008 | Shibata et al. |
| 7,436,085 B2 | 10/2008 | Shibata et al. |
| 7,442,009 B2 | 10/2008 | Arel |
| 7,445,431 B2 | 11/2008 | Larsen et al. |
| 7,528,497 B2 | 5/2009 | Bertolotti |
| 2007/0114798 A1* | 5/2007 | Cairo ............................ 290/44 |
| 2008/0012345 A1 | 1/2008 | Parker |
| 2008/0012346 A1* | 1/2008 | Bertolotti ...................... 290/55 |
| 2008/0206055 A1* | 8/2008 | Godsk et al. ................. 416/147 |
| 2009/0068012 A1* | 3/2009 | Bertolotti ....................... 416/9 |

* cited by examiner

WIND TURBINE WITH HIGH SOLIDITY ROTOR

BACKGROUND

The present disclosure relates to a wind turbine, and more particularly to a wind turbine rotor having a shell construction.

A common goal for commercial wind-turbine manufacturers is to design and produce a wind-turbine that provides the lowest possible cost of energy (COE) throughout the operational life of a wind-turbine. The COE is determined by a comparison of total yearly costs to yearly energy produced. Thus, the COE is minimized by lowering turbine cost while simultaneously increasing the yearly energy capture.

Wind turbines with 2-bladed rotors may offer weight and cost advantages over three-bladed rotors which are typically used with large, multi-megawatt turbines. One issue with conventional 2-bladed rotors has been noise emissions. Each individual blade in conventional 2-bladed rotors is typically comparable in solidity, e.g. blade chord, to blades on 3-bladed rotors. Consequently, peak rotor efficiency of the 2-bladed rotors is obtained at relatively higher tip-speed ratios, which results in high tip velocity and the associated increase in noise emissions.

Three-bladed rotors are sometimes requested when factors such as optical appeal outweigh cost savings. To allow the option of a two or three bladed rotor, a turbine manufacturer is required to design and produce two different wind turbines which share few common elements. Consequently, the manufacturing, inventory, packaging and other costs are increased.

It is thus desirable to provide a turbine design which provides for a two or three bladed rotor with significant commonality.

SUMMARY

A wind turbine according to an exemplary aspect of the present disclosure includes a nacelle support structure rotationally mounted to a tower through a yaw bearing for rotation about a yaw axis. A hollow shaft rotationally mounted to the nacelle support structure through a rotor bearing for rotation about a rotor axis of rotation. A blade support body mounted to the hollow shaft though a teeter system which permits teetering action of the blade support body with respect to the hollow shaft. A first shaft arm and a second shaft arm which extends from the hollow shaft to engage with a respective first teeter bearing and second teeter bearing of the teeter system, the first teeter bearing and the second teeter bearing defined along a teeter axis. A first teeter restraint and a second teeter restraint are aligned along a restraint axis generally perpendicular to the teetering axis, the first teeter restraint and the second teeter restraint mounted between the blade support body and the hollow shaft on a blade support body of the rotor bearing. A generator supported by the nacelle support structure opposite the hollow shaft.

A wind turbine according to an exemplary aspect of the present disclosure includes a nacelle support structure rotationally mounted to the tower through a yaw bearing for rotation about a yaw axis. A hollow shaft rotationally mounted to the nacelle support structure through a rotor bearing for rotation about a rotor axis of rotation. A blade support body mounted to the hollow shaft, the blade support body supports either of a two-bladed rotor system and a three-bladed rotor system, the two-bladed rotor system and the three-bladed rotor system have essentially equal solidity.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
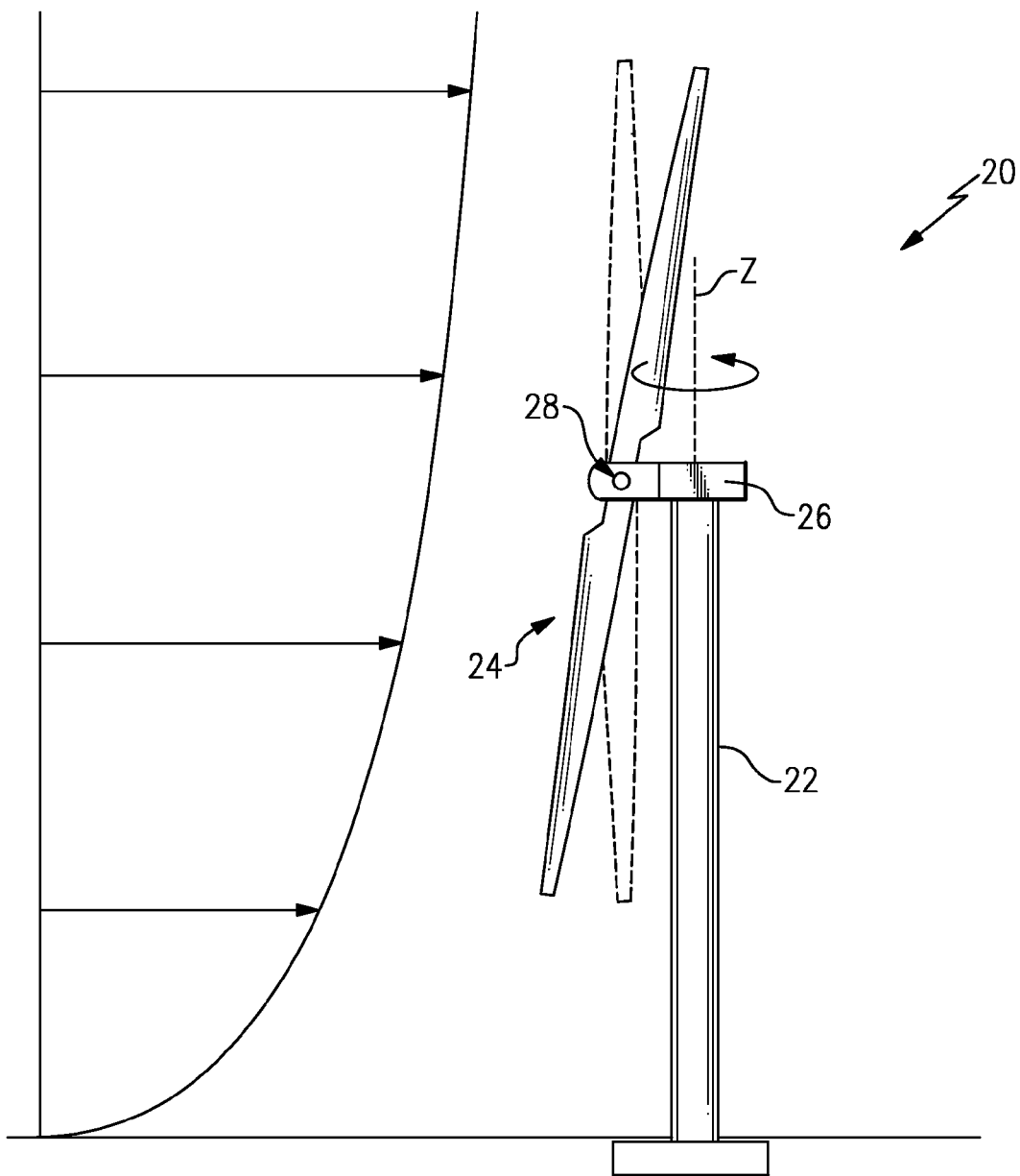
FIG. 1 is a general perspective view of a complete wind-turbine.

FIG. 1 schematically illustrates a wind-turbine 20 which generally includes three main structural systems including a tower 22, a rotor 24, and a nacelle 26 that is rotationally attached to the tower 22 for rotation about a yaw axis Z. Aerodynamic power generated by the rotor 24 is controlled by changing a yaw-angle of the nacelle 26. The rotor 24 is connected with the nacelle 26 through a teeter system 28 to minimize gyroscopic forces produced during yawing so as to avoid potential damage to the wind-turbine structures. The teetering motion facilitates balance of the gyroscopic forces through blade acceleration and aerodynamic damping forces.

Figure 2:
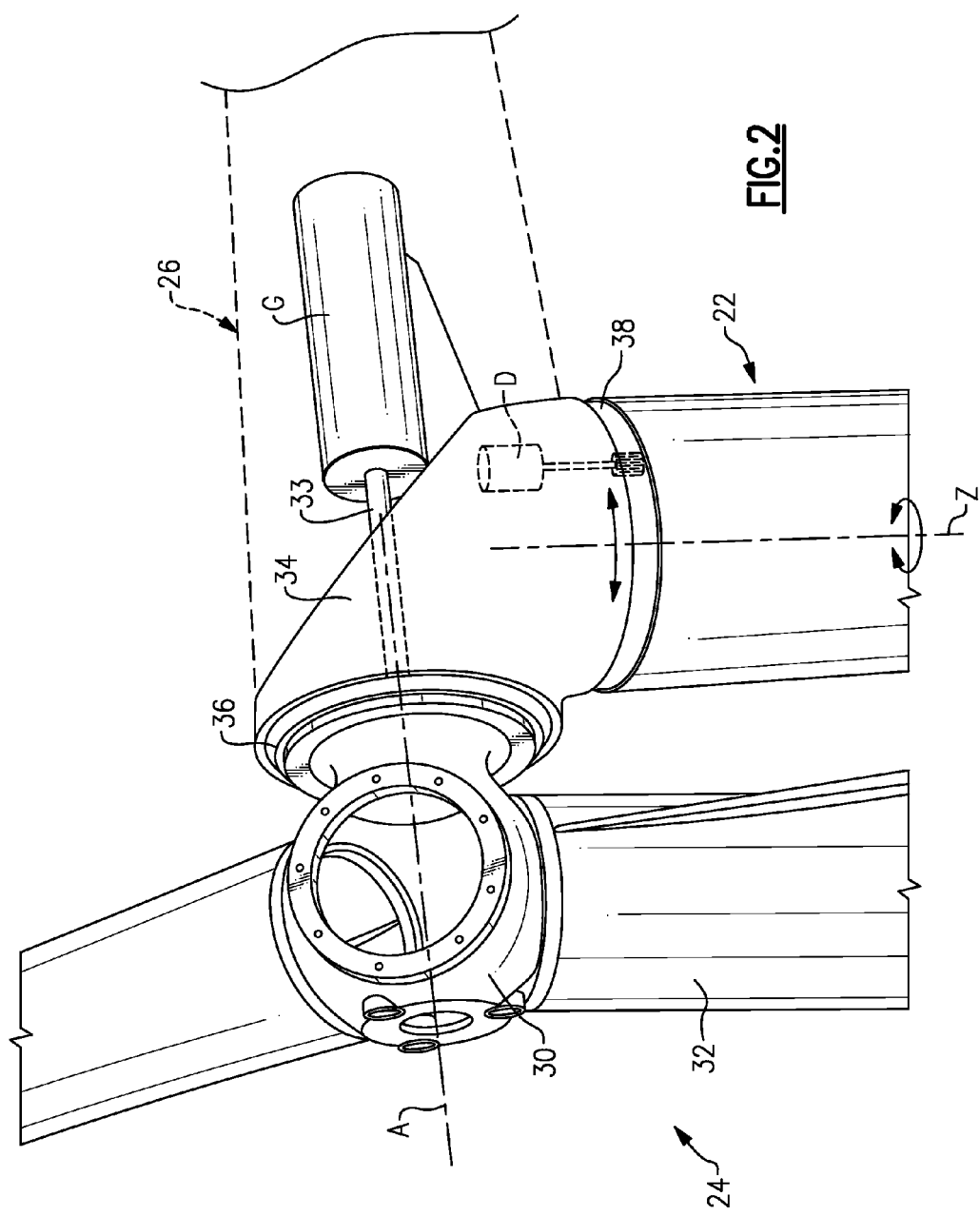
FIG. 2 is a perspective partial phantom view of tower-top assembly.

Referring to FIG. 2, the rotor 24 includes a hub 30 which supports a multiple of blades 32. The blades 32 are fixedly attached to the hub 30. The portion of each blade 32 which contacts the hub 30 is defined herein as a blade root. For nomenclature and identification purposes only, the blade 32 may be defined along the span, i.e., distance from root to tip, into three sections: (1) an area of the blade extending from the blade root to essentially about 15% of the span is called a blade-root region; (2) an area from 15% of the span to about 25% of the span is called an inner blade region; and a remainder area of the span is called an outer blade region. Although a three-bladed hub is disclosed in the illustrated non-limiting embodiment, it should be understood that any number of blades may alternatively be provided.

The hub 30 is supported upon a nacelle support structure 34 which rotates about a rotor axis of rotation A through a rotor bearing 36 to drive a generator G contained in the nacelle 26. The rotor bearing 36 is of a relatively large diameter which, in one non-limiting embodiment, is approximately equivalent to the diameter of the hub 30.

The nacelle support structure 34 provides a horizontal displacement from the tower 22 and is angled relative to the tower 22 such that a drive-train 33 from the hub 30 will extend generally along the rotor axis of rotation A to drive the generator G. The nacelle support structure 34 is rotationally attached to the tower 22 through a yaw bearing 38. The entire tower-top assembly, i.e. the components above the yaw bearing 38 may be rotated about the yaw axis Z through at least one yaw drive system D (illustrated schematically).

Figure 3:
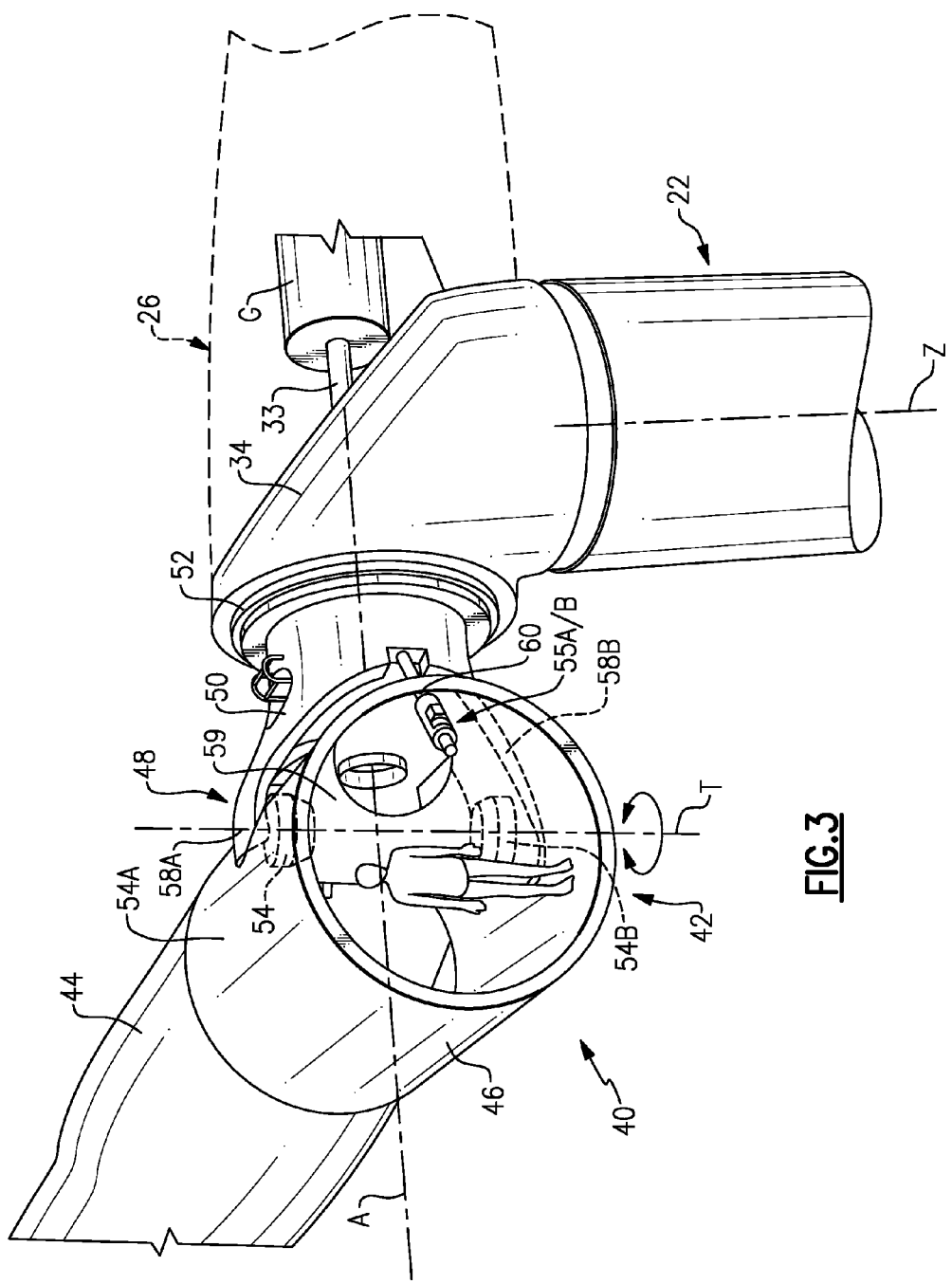
FIG. 3 is a perspective partial phantom view of another tower-top assembly.

Referring to FIG. 3, another non-limiting embodiment of a rotor 40 includes a hub 42 to which is mounted a multiple of blades 44. The hub 42 includes a blade support body 46 rotationally attached through a teeter system 48 to a hollow shaft 50 which permits a teetering motion of the blade support body 46 with respect to the hollow shaft 50. The hollow shaft 50 defines a diameter commensurate with a rotor bearing 52, which defines the rotor axis of rotation A relative to the nacelle support structure 34 to provide for an essentially interchangeable rotor 24.

The hollow shaft 50 may be attached to the rotor bearing 52 via bolts, and is thus "bolt-compatible" and interchangeable with a three (FIG. 2) or two (FIGS. 3 and 4) bladed rotor which will attach to the same rotor bearing 52. That is, the drive-train 33 is located opposite the hollow shaft with respect to the rotor bearing 52 to provide interchangeability. The drive-train 33 extends outwardly of the nacelle support structure 34, and to the generator G, which is also located axially beyond the hollow shaft 50. This interchangeability is an attractive feature in the wind-energy market, because such interchangeability offers the option of a two-bladed rotor, when cost minimization is the highest priority or a three-bladed rotor for alternative reasons such as aesthetics. Interchangeability is also advantageous for the manufacturer of the turbine as a single drive train 33 may be used for multiple bladed rotors to facilitate lower inventory, tooling, and manufacturing costs.

To provide for the essentially interchangeable rotor, the rotor rotational velocity at peak aerodynamic efficiency of both the three-bladed and two bladed rotor should be essentially equal. This allows the same gearbox ratio and generator to be used, i.e., the drive train 33 stays the same. To use a two-bladed rotor with peak aerodynamic efficient at the same rotor rotational speed as a three bladed rotor, the solidity must be essentially equal. This solidity is achieved through the large, hollow shaft 50. The blades 44 may be fixedly attached to the blade support body 46 without a blade pitch bearing for use with an active yaw system which controls aerodynamic power. The avoidance of blade pitch bearings frees the blade shape from blade-root "necking" restrictions typically associated with pitch capable blades and facilitates the solidity.

The strength and stiffness of a body is proportional to the body's elastic modulus, times the body's second moment of inertia, about axis A. Since the inertia term increases with the square of the distance between a parcel of material and the centroidal axis, the hollow shaft 50, having most of the mass located far from the axis A, displays higher strength to weight ratios than a conventional solid shaft. The blade support body 46 maintains a majority of mass far from the centroidal axis and thus provides higher strength to weight ratios. This lower weight to strength ratio leads to a low-weight rotor. Additionally, the blades 44 are fixedly attached to the blade support body 46, and are characterized by a large root cross-section, that places material as far from the centroidal axis as possible, thereby increasing the second moment of inertia, and the blade strength and stiffness, as discussed above.

The teeter system 48 includes a teeter bearing system 54 and teeter restraint system 55 which permits teetering action of the blade support body 46 with respect to the hollow shaft 50. At least one teeter restraint 55A, 55B connects the blade support body 46 to the hollow shaft 50 such that the relatively large diameter of the hollow shaft 50 provides widely spaced apart attachment points for the teeter bearing system 54 which lowers teeter-bearing stresses and provides widely spaced apart attachment points for the teeter-restraint system 55 which results in relatively lower stresses on the teeter restraint system 54.

The relatively large diameter of the hollow shaft 50 also accommodates a relatively large-diameter blade support body—or more generally, a large cross-sectional area when the cross-section of the blade support body is not circular—and blades with a matching large-diameter blade-root section which provides for optimal noise reduction and blade shape.

The hollow shaft 50 includes shaft arms 58A, 58B which mount to the blade support body 46 through a first teeter bearing 54A and a second teeter bearing 54B and extend generally in parallel to rotation of the rotor along axis A. The teeter bearings 54A, 54B may be supported upon a reinforced area 59 formed within the blade support body 46. The shaft arms 58A, 58B are mounted essentially outside and around the blade support body 46 to provide a pincer arrangement. For the two-bladed rotor to be interchangeable with the three-bladed rotor, the teeter restrain system 55 must be inside the hub 50 or, at least, on the hub side of the support bearing 52. This placement of the teeter restraint devices facilitates rotor interchangeability.

The first teeter bearing 58A and the second teeter bearing 58B are aligned along a teetering axis T oriented perpendicular to the axis of rotation A of the blade support body 46, or at a small angle, commonly referred to as "delta.3" by those skilled in the art. The first teeter bearing 58A and the second teeter bearing 58B are attached at essentially diametrically opposite locations on the blade support body 46 to permit a teetering motion of the blade support body 46 about the teeter axis T relative to the hollow shaft 50 yet otherwise excludes essentially all other types of relative motion between the blade support body 46 and the hollow shaft 50.

The teeter restraint system 55 is mounted to the blade support body 46 to extend through an opening 60 defined therethrough to engage with the hollow shaft 50. The teeter restraint system 55 includes a first teeter restraint 55A and a second teeter restraint 55B aligned generally perpendicular to the teetering axis T to resist rotation therearound. The teeter restraint system 55 limits the teetering motion of the hollow shaft 50.

The blade support body 46 in this non-limiting embodiment provides a circular cross-section as a compromise between efficient coupling with the hollow shaft 50 which results in a generally equal dimension between separation of the teeter bearings 58A, 58B and the rotor bearing 52 diameter to maximize the blade-root cross-sectional area. The circular cross-section facilitates use of a pitch bearing, if desired.

Both the teeter bearings 58A, 58B and the teeter restraints 55A, 55B produce a moment force on the blade support body 46. The hollow shaft 50, having a diameter commensurate with the diameter of the single, relatively large rotor bearing 52, provides for a much larger separation distance between the teeter bearings 58A, 58B and the teeter restraints 55A, 55B from the axis of rotation A. This large spacing reduces the forces, and hence the stresses which provides longer life and lower weight. Additionally, placing the teeter restraint system 55 inside the blade support body 46 provides protection for the teeter restraints 55A, 55B and associated control units (not shown) from harsh weather conditions while facilitating routine maintenance and repair from within the blade support body 46.

Regulations for wind-turbine noise emissions effectively limit the tip-speed of wind-turbines to about 65 m/s, irrespective of blade length. Rotors are thus designed to achieve maximal efficiency when the blade tip velocities are near 65 m/s. The tip-speed ratio (ratio of blade tip velocity to wind velocity) at which maximum efficiency occurs is controlled by the solidity of the rotor, which is defined as the ratio of rotor blade surface area to the front swept area that the rotor passes through. Current three-bladed rotors achieve maximum performance at a tip-speed ratio (ratio of blade-tip velocity to wind velocity) of about 7.5, with a solidity of about 5%. In contrast, current two-bladed machines achieve maximum efficiency at higher tip-speed ratios—around 10—due to a lower solidity. The lower solidity follows from the use of blades having (individually) essentially similar planform as those used in three-bladed rotors. The use of similar blades, furthermore, follows from the cost and weight limitations imposed by both the blade-pitch bearing, to which the blade attaches (in conventional designs) and to the weight and size of the hub, which must connect to a central, solid rotor shaft.

The use of the hollow shaft 50 essentially removes both of these constraints by providing a low-weight hub with a blade-root attachment with large cross-sectional area. In particular, in the disclosed, non-limiting embodiment, no pitch bearings are provided which allows the blade root cross-section to grow to dimensions limited only by the transportation restrictions. The consequence of the large blade-root cross-section is a blade with higher solidity (i.e. larger chord) with essentially no weight penalty. This is because the increase in the second-moment of inertia provides a material benefit that offsets the increased material needed by the increased blade surface area. The net benefit, thus, is a two-bladed rotor having essentially the same solidity, hence maximal tip speed and noise emissions, as a three-bladed rotor. To be more precise, at equal tip-speed operation, the noise from a 2-blade rotor will be about the square-root of ⅔ times lower than that of the three-bladed rotor, due to less total trailing-edge length and resultant broad-band noise.

Figure 4:
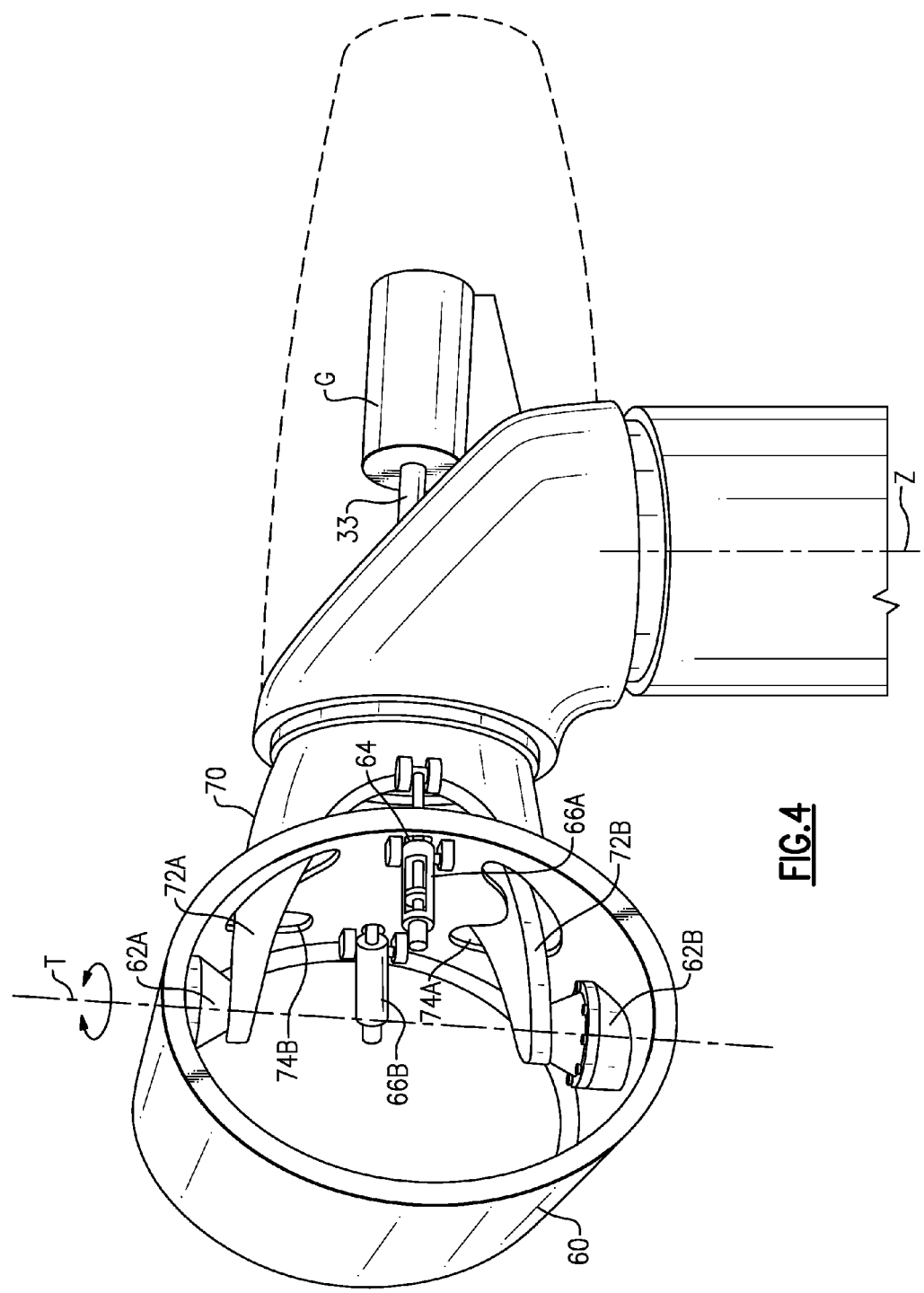
FIG. 4 is a perspective partial phantom view of another tower-top assembly.

Referring to FIG. 4, a blade support body 60 in another non-limiting embodiment defines an elliptical cross-section. A set of teeter bearings 62A, 62b are mounted inside the blade support body 60 adjacent the focus points of the elliptical cross-section shape which facilitates a maximal cross-sectional area for both the blade support body 60 and the blade-root cross-section.

A set of teeter restraints 66A, 66B are pivotally mounted to the blade support body 60 and extend through a respective opening 64 defined thereby to pivotally engage with a hollow shaft 70. The first teeter restraint 66A and the second teeter restraint 66B are aligned generally perpendicular to the teetering axis T.

The hollow shaft 70 includes shaft arms 72A, 72B which penetrate through the blade support body 60 at openings 74A, 74B. Additional material may be required about the openings 74A, 74B to compensate for stress-concentrations. Furthermore, the shaft arms 72A, 72B and the openings 74A, 74B may include complementary shapes. The complementary shapes may be arcuate as illustrated in the disclosed non-limiting embodiment. With an elliptical cross-section, blade pitch bearings are absent and aerodynamic control is achieved through active yaw as readily understood.

The disclosure provides a two-bladed rotor for wind-turbines having a blade support body with a shell-like construction to move all forces and stresses onto the shell and join to the drive train via a single large bearing. The rotor provides aerodynamic properties, including tip-speed-ratio at maximum aerodynamic performance essentially equal to a three-bladed rotor, and integral teeter-restraint devices. These factors provide for cost and weight advantages, as well as to interchangeable, "bolt-compatible" 2 and 3 bladed rotors attachable to a common drive-train.

The disclosure provides interchangeability with a three-bladed rotor through a common drive-train to allow a manufacturer to offer a lower-cost turbine with two blades when cost is of primary importance to the customer, or with three blades when requirements such as aesthetic reasons are is stipulated in the wind-shaft arm development permit. Moreover, the disclosure operates a drive-train for either a two-bladed or three-bladed rotor at optimal aerodynamic efficiency during normal turbine operation.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A wind turbine comprising:
   a tower;
   a nacelle support structure rotationally mounted to said tower through a yaw bearing for rotation about a yaw axis;
   a hollow shaft rotationally mounted to said nacelle support structure through a rotor bearing for rotation about a rotor axis of rotation;
   a blade support body mounted to said hollow shaft through a teeter system which permits teetering action of said blade support body with respect to said hollow shaft;
   a first shaft arm and a second shaft arm which extends from said hollow shaft generally parallel to said rotor axis of rotation to engage with a respective first teeter bearing and second teeter bearing of said teeter system, said first teeter bearing and said second teeter bearing defined along a teeter axis; and
   a teeter restraint system aligned along a restraint axis generally perpendicular to said teetering axis said first teeter restraint system mounted between said blade support body and said hollow shaft, a generator supported by said nacelle support structure outwardly of said hollow shaft, said generator being located axially outwardly of said hollow shaft.

2. The wind turbine as recited in claim 1, wherein said first teeter bearing and said second teeter bearing define a separation dimension generally equal to a diameter of said rotor bearing.

3. The wind turbine as recited in claim 1, wherein said first shaft arm and said second shaft arm extend at least partially through said blade support body.

4. The wind turbine as recited in claim 3, wherein said blade support body is elliptical in cross-section.

5. The wind turbine as recited in claim 1, wherein said blade support body supports either of a two-bladed rotor system and a three-bladed rotor system, said two-bladed rotor system and said three-bladed rotor system have essentially equal solidity which is defined as a ratio of rotor blade surface area to a front swept area that the rotor blades pass through.

6. The wind turbine as recited in claim 5, wherein said generator is driven by a drive-train connected to said hollow shaft, said drive-train operable to receive power from either of a three-bladed rotor and a two-bladed rotor.

7. The wind turbine as recited in claim 5, wherein said two-bladed rotor has a tip-speed ratio of approximately 7.5 with a solidity of approximately 5%.

8. The wind turbine as recited in claim 5, wherein said blade support body is elliptical in cross-section.

9. The wind turbine as recited in claim 5, wherein said blade support body is circular in cross-section.

10. The wind turbine as set forth in claim 1, wherein said generator is driven by a drive train connected to said hollow shaft, and at a location outwardly of said hollow shaft.

11. A wind turbine comprising:
a tower;
a nacelle support structure rotationally mounted to said tower through a yaw bearing for rotation about a yaw axis;
a hollow shaft rotationally mounted to said nacelle support structure through a rotor bearing for rotation about a rotor axis of rotation; and
a blade support body mounted to said hollow shaft through a teeter system which permits teetering action of said blade support body with respect to said hollow shaft;
a first shaft arm and a second shaft arm which extends from said hollow shaft generally parallel to said rotor axis of rotation and engaging with a respective first teeter bearing and second teeter bearing of said teeter system, said first teeter bearing and said second teeter bearing defined along a teeter axis;
a generator supported by said nacelle support structure opposite said hollow shaft; and
a first teeter restraint and a second teeter restraint aligned along a restraint axis generally perpendicular to said teetering axis, said first teeter restraint and said second teeter restraint mounted within said blade support body, extending out of said blade support body and attaching to said hollow shaft.

12. The wind turbine of claim 11 wherein said first arm shaft and said second arm shaft extend through said blade body support.

13. The wind turbine of claim 11 wherein said first teeter bearing and said second teeter bearing are disposed completely inside said blade body support.

14. A wind turbine comprising:
a tower;
a nacelle support structure rotationally mounted to said tower through a yaw bearing for rotation about a yaw axis;
a hollow shaft rotationally mounted to said nacelle support structure through a rotor bearing for rotation about a rotor axis of rotation;
a blade support body mounted to said hollow shaft through a teeter system which permits teetering action of said blade support body with respect to said hollow shaft;
a first shaft arm and a second shaft arm which extends from said hollow shaft generally parallel to said rotor axis of rotation to engage with a respective first teeter bearing and second teeter bearing of said teeter system, said first teeter bearing and said second teeter bearing defined along a teeter axis;
a teeter restraint system aligned along a restraint axis generally perpendicular to said teetering axis said first teeter restraint system mounted between said blade support body and said hollow shaft, a generator supported by said nacelle support structure outwardly of said hollow shaft; and
said teeter restraint system including a first teeter restraint and a second teeter restraint, with said first teeter restraint and said second teeter restraint being mounted within said blade support body, and extending outwardly of said blade support body and attached to said hollow shaft.

15. A method of providing a wind turbine comprising the steps of;
(a) providing a nacelle support structure rotationally mounted to a tower through a yaw bearing for rotation about a yaw axis;
(b) providing a hollow shaft rotationally mounted to said nacelle support structure through a rotor bearing for rotation about a rotor axis of rotation;
(c) attaching a blade support body to said hollow shaft, and said blade support body being selected from at least two possible blade support bodies, with one of said possible blade support bodies supporting a two-blade rotor system, and another of said possible blade support bodies mounting a three-bladed rotor system, with said two-bladed rotor system and said three-bladed rotor system being provided with essentially equal solidity, defined as a ratio of rotor blade surface area to a front swept area that the rotor passes through.

* * * * *